May 15, 1956 — T. M. RIDDICK — 2,745,553
FILTER BOTTOM FOR FIXED BED FILTERS
Filed Nov. 16, 1951 — 3 Sheets-Sheet 1

INVENTOR:
THOMAS M. RIDDICK
BY
Curtis, Morris & Safford
ATTORNEYS:

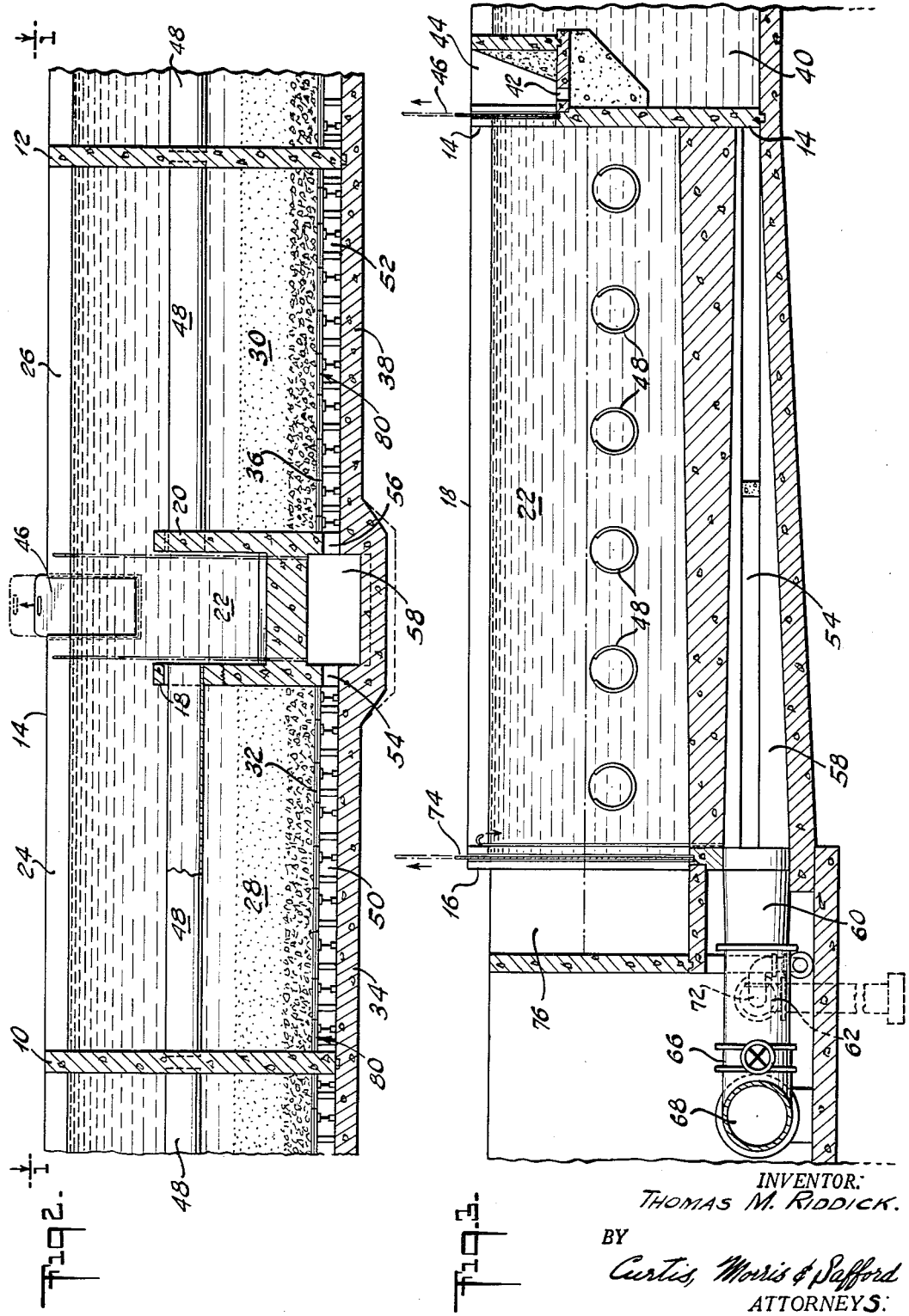
May 15, 1956  T. M. RIDDICK  2,745,553
FILTER BOTTOM FOR FIXED BED FILTERS
Filed Nov. 16, 1951  3 Sheets-Sheet 2
INVENTOR.
THOMAS M. RIDDICK.
BY
Curtis, Morris & Safford
ATTORNEYS.

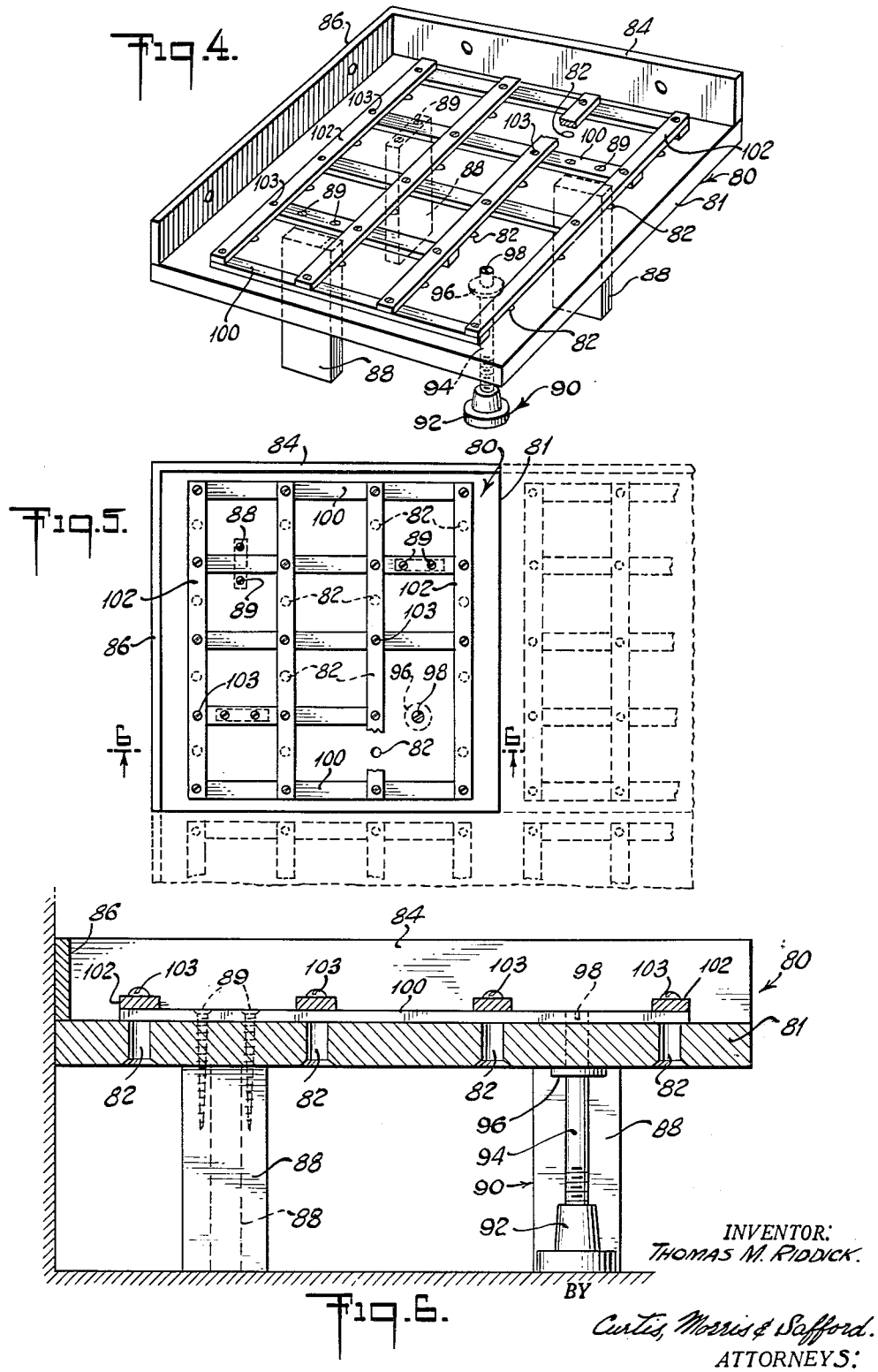

United States Patent Office 2,745,553
Patented May 15, 1956

2,745,553

FILTER BOTTOM FOR FIXED BED FILTERS

Thomas M. Riddick, New York, N. Y., assignor to Filtration Equipment Corporation, Rochester, N. Y., a corporation of New York Application November 16, 1951, Serial No. 256,644

9 Claims. (Cl. 210—124)

This invention relates to filtration such as is commonly used in filtering water, sewage and the like, and more particularly to certain structural improvements in the so-called "Rapid Sand" gravity filter.

"Rapid Sand" filters commonly comprise an enclosure containing a filtering bed supported on a foraminous floor or filter bottom through which the liquid to be filtered can flow. The filter bed may be composed of sand and gravel of graded particle sizes with the finer particles at the top of the bed and the coarser particles at the bottom of the bed. Filtration is effected by passing the liquid to be filtered downwardly through the bed and foraminous filter bottom or pipe grid system to an enclosed space from which the filtered liquid is withdrawn. The foraminous bottom or grids and associated receiving space for the filtered liquid is commonly referred to as the "underdrainage system" of the filter. Periodically, filtration of the liquid is interrupted and the filter is cleaned by backwashing, i. e., a washing liquid is caused to flow upwardly through the foraminous bottom and bed to remove therefrom solids that have previously been removed from the processed liquid as it flowed down through the bed.

With the filters of this type that have been previously available a number of operational difficulties have been encountered. Thus difficulties have been encountered due to corrosion of various metal parts of the filter causing, for example, partial or complete plugging of holes in the foraminous bottom or grid. Also, the particulate material at the lower surface of the filter bed tends to plug the holes in the foraminous bottom thereby producing a non-uniform flow through the bed. Moreover where finely porous filter bottoms are used, clogging may occur due to silt, sediment or algae. Uniform distribution of flow is particularly important during backwashing in order to insure proper cleaning of the filter bed, and it has not been possible to achieve the desired degree of uniformity with prior filters.

It is a general object of the invention to provide an improved "Rapid Sand" filter. It is a more specific object of the invention to provide such a filter wherein corrosion difficulties are eliminated. It is another object of the invention to provide an under-drainage system for such a filter which produces a more nearly uniform distribution of flow during both filtering and backwashing operations than has theretofore been achieved. It is another object of the invention to provide an under-drainage system that can be readily and economically installed, inspected and repaired. Other objects of the invention will be in part obvious and in part pointed out hereafter.

The many objects and advantages of the invention may best be understood and appreciated by reference to the accompanying drawings which illustrate a "Rapid Sand" filter incorporating a preferred embodiment of the present invention. "Rapid Sand" filters of the type with which the present invention is concerned are ordinarily constructed as a series of interconnected units of similar construction. For purposes of simplifying the description, only a single unit is fully shown in the drawings with the adjacent units being fragmentarily shown at the sides of the filter unit that is described in detail. As previously indicated, such filters can be used for filtering liquids other than water. However, they are primarily used as water filters and the illustrative embodiment now to be described will therefore be described as a water filter.

In the drawings:

In Fig. 1, as in the subsequent figures of the drawings, the flow of water to be filtered is indicated by solid line arrows and the flow of backwashing water is indicated by dotted line arrows.

Fig. 2 is a vertical section taken on the line 2—2 of Fig. 1 and showing the feed channel and filter bed as well as portions of the under-drainage system;

Fig. 3 is a vertical section taken on line 3—3 of Fig. 1, i. e., at right angles to the section of Fig. 2 and showing further details of the under-drainage system;

Fig. 4 is a perspective view of a corner section of the foraminous bottom that supports the filter bed;

Fig. 5 is a top plan view of the foraminous bottom of the filter showing the corner section of Fig. 4 in solid lines and adjacent sections of the bottom in dotted lines; and, Fig. 6 is an enlarged vertical section taken on the line 6—6 of Fig. 5 and showing further details of the construction of the filter bottom.

Figure 1:
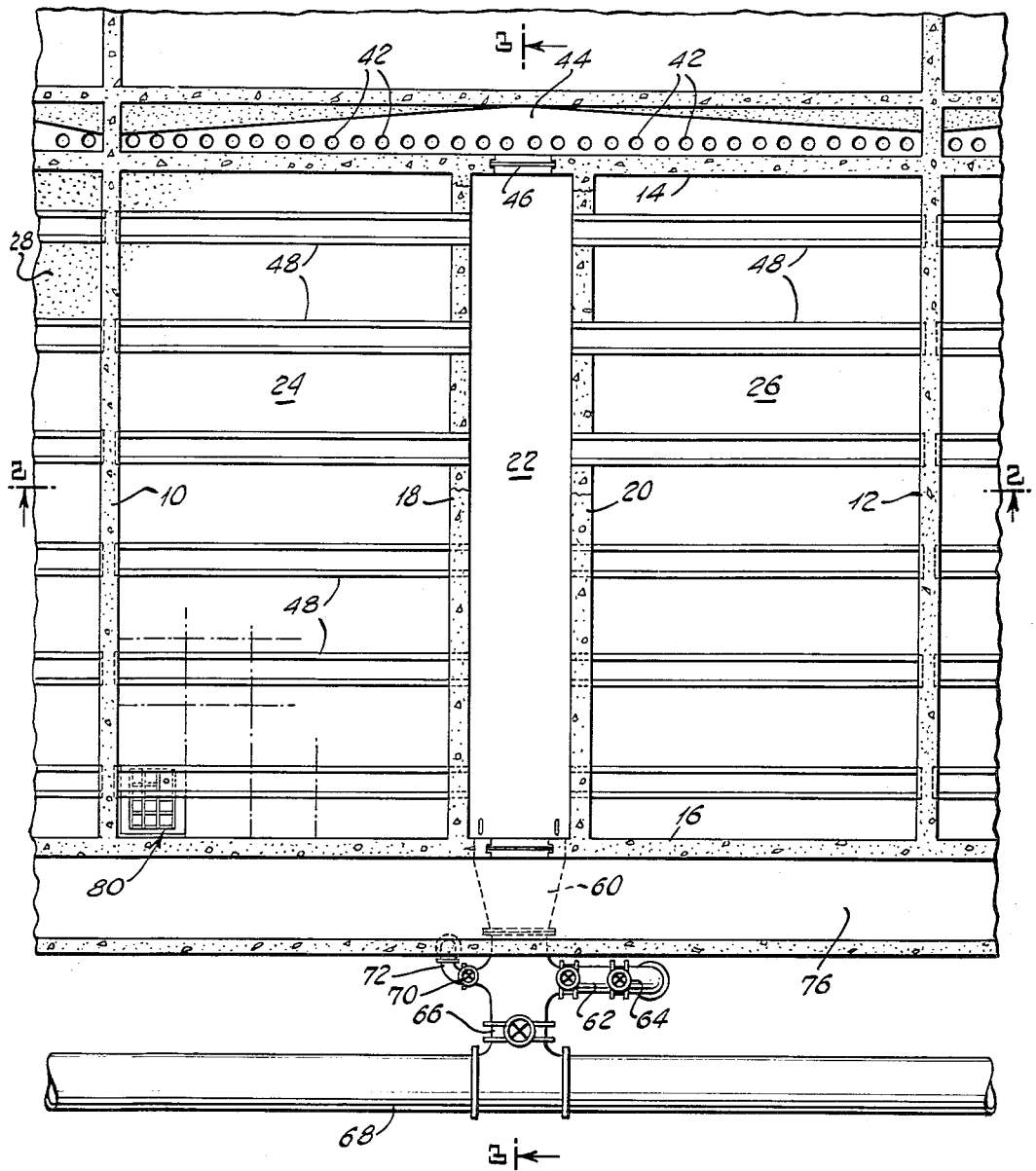
Fig. 1 is a top plan view of a filter unit showing the central feed channel with a filter bed on each side thereof.

Referring to the drawings, and more particularly to Fig. 1, the filter unit there shown comprises, in general, a rectangular enclosure defined by the side walls 10 and 12 and end walls 14 and 16. The enclosure is internally partitioned by walls 18 and 20 which cooperate with portions of end walls 14 and 16 to define a feed channel 22 and with side walls 10 and 12 and portions of the end walls to define a par of filtering chambers 24 and 26.

Referring to Fig. 2 the filtering chambers 24 and 26 contain the filter beds 28 and 30 respectively which are composed of sand and gravel graded as to size in such manner that the finer material is at the top of the bed and the coarser material at the bottom of the bed. The bed 28 is supported on a foraminous bottom 32 which is spaced from and supported by the floor 34 of filter chamber 24. In like manner, the filter bed 30 is supported on a perforate bottom 36 which is spaced from and supported by the floor 38 of filter chamber 26. The construction of perforate bottoms 32 and 36 will be described in detail hereafter.

Referring particularly to the right-hand side of Fig. 3, water to be filtered is supplied from a sedimentation basin 40 located adjacent to the end wall 14 of the filter unit. The water level of basin 40 is such that water flows under its own head upwardly through a series of holes 42 (best shown in Fig. 1) into a transfer channel or basin 44 and thence into the feed channel 22. The flow of water from basin 44 into feed channel 22 is regulated by a slide gate 46 which is raised to an extent sufficient to permit the desired flow of feed water into the feed channel.

Referring to Figs. 1 and 3, water entering the feed channel 22 flows laterally into the chambers 24 and 26 and is distributed throughout the chambers. During filtration, the water level in the filtering chamber is maintained near the top of the chamber as indicated in Fig. 3. Suitable controls can be provided for regulating this water level as desired.

Referring particularly to Fig. 2, water entering the filtering chambers 24 and 26 flows downwardly through the beds 28 and 30 respectively and through the perforations in filter bottoms 32 and 36 into drainage channels 50 and 52 formed between the perforate bottoms and filter chamber floors 34 and 38 respectively. Suspended matter is removed from the feed water during its passage through the filter beds in the usual manner. The filtered water collecting in drain channels 50 and 52 flows laterally through the passages 54 and 56 in walls 18 and 20 respectively to a filtered water transfer channel 58 and then (see Fig. 1) through a short pipe section 60 and branch pipe 62 containing a shut-off valve 64 to a suitable point of use or storage. The pipe section 60 is also connected through a shut-off valve 66 with a backwash water header 68 and through a shut-off valve 70 with a branch pipe 72, the function of which will be described hereafter.

When the filter has been in operation for some hours, a sufficient amount of suspended matter collects in the filter beds to make it desirable to clean these beds. Such cleaning of the filter is ordinarily effected by backwashing, and structure is provided in the present filter for this purpose. Referring particularly to Fig. 1, in order to effect backwashing of the filter beds the slide gate 46 is closed to shut off the supply of feed water, and, after partial drainage of the filtering chambers 24 and 26, the shut-off valve 64 in the filtered water discharge pipe 62 is closed. Thereafter, valve 66 is opened to permit backwashing water to flow from header 68 back through pipe section 60 and thence (see Fig. 2) into drain channels 50 and 52, upwardly through the perforate bottoms 32 and 36, and through the filter beds 28 and 30, from which it removes the accumulated suspended matter that has previously been removed from the feed water.

After passing through the filter beds, the backwash water (see Fig. 1) flows into and through a series of wash water troughs 48 into channel 22. This channel is provided, at its end opposite gate 46, with a second similar gate 74 slidably mounted in the wall 16 of the filtering unit enclosure. During backwashing, the gate 74 is raised to permit backwash water to flow from channel 22 into a laterally-extending backwash drain channel 76, whence the wash water flows to a suitable point of disposal.

Upon completion of the backwashing operation valve 66 is closed to cut off the supply of backwash water to the filter, gate 74 is lowered, and gate 46 is again raised. Ordinarily the water initially discharged from the filter bed after backwashing is somewhat turbid, and it is desirable that this turbid water be by-passed. Hence valve 64 is maintained closed and valve 70 opened to cause the turbid water to flow through pipe 72 to a suitable point of disposal. When the water discharged from the filter becomes clear, valve 70 is closed and valve 64 opened to cause the filtered water to flow through pipe 62 as described above.

As previously indicated there is a tendency for the holes in conventional foraminous filter bottoms to become plugged. Plugging of the holes in foraminous bottoms may occur either through corrosion of the material of which the bottom is constructed or may be due to particles of the filter bed partially or completely covering the holes. Such plugging is highly undesirable since it results in non-uniform filtration during the filtering step and uneven distribution of the backwashing water, which in turn results in incomplete cleaning of the filter beds during backwashing. To overcome these difficulties the present invention provides a novel filter bottom construction which is best shown in Figs. 4 to 6 of the drawings.

The filter bottom of the filter illustrated is constructed in separate sections or units that are individually set in place. Referring particularly to Fig. 4 the filter bottom section 80 there shown comprises a rectangular plate 81 having uniformly spaced holes 82 formed therein of such large diameter as to avoid clogging and minimize frictional resistance to upflow of water which tends to lift the filter bottom. Baffle strips 102 hold the filter gravel away from the holes 82 and allow free flow into a distribution space beneath these baffles. Side walls 84 and 86 are provided at two sides of the plate 81 by means of which the corner filter bottom section shown can be secured to the side walls of the filter enclosure to prevent by-passing of water at this junction. The filter section 80 is supported on three non-adjustable piers or legs 88 of identical height that are secured to the underside of the plate 81 in any suitable manner such as by the screws 89, and a leg 90 of height which can be adjusted to give four-point support to plate 81 in spite of irregularities in the filter floors 34 or 38. As shown leg 90 comprises a foot portion 92 into which is threaded an upwardly extending shaft 94 that extends through a hole in plate 81. The shaft 94 is provided near its upper end with a collar 96 that normally bears against the underside of plate 81 and thereby supports it. The height of collar 96 above foot 92 can be varied by rotating shaft 94 which is provided at its upper end with a kerf 98 to facilitate such rotation of shaft 94 by means of a screwdriver. The adjustable leg 90 provides a means whereby the filter section 80 may be adjusted to cause the load on all legs to be equalized after the filter section has been installed.

The upper surface of plate 81 is provided with two courses or tiers of slats. The slats 100 of the first tier are equally spaced and secured to the plate 81 between adjacent lines of holes 82. The slats 102 of the second tier overlie the slats of the first tier and are arranged at right angles thereto. The slats 102 are positioned directly over the holes 82 and are substantially broader so that they extend laterally beyond the holes on both sides and thereby act as baffles to prevent entry of the particular matter of the filter beds into the holes. The slats of the first and second tiers are secured to plate 81 at their points of intersection in any suitable manner such as by means of the screws 103.

The filter plate 81, slats 100 and 102, and legs 88 are preferably all made of asbestos cement, such as, for example, that sold under the trade name "Transite," in order to avoid corrosion difficulties. With the structure described, plugging of holes 82 is avoided and uniform distribution of flow is insured during both the filtering and backwashing operations. As particularly shown in Fig. 6 the holes 82 are preferably beveled at the bottom of plate 81 to reduce the pressure drop of the water flowing upward through these holes.

The structure of the filter section 80 presents important advantages from the point of view of securing efficient cleaning of the filter beds during backwashing. I have found that unusually effective cleaning of the filter bed can be achieved by using a relatively high flow rate during backwashing. A vertical rise of at least 36 inches per minute in the filter bed has been found to give effective cleaning. Such a high backwashing rate expands the bed during backwashing, that is, it lifts the particles of the bed to some extent so that the spacing between the particles is increased and dirt effectively removed therefrom. When operating at such a high backwashing rate uniform distribution of flow of the backwash water is essential because otherwise it is not possible to obtain the desired expansion of the bed and at the same time avoid having portions of the sand of the filter bed carried out of the filter with the backwash water. The structure described above insures uniform distribution of flow and hence permits relatively high backwash flow rates to be used with the improved cleaning that results therefrom.

The holes in filter section 80 are made sufficiently large so that the filter bottom sections will not themselves be lifted by the high backwash rate. In other words, the holes are of such size that the pressure drop of the water passing therethrough is less than the weight of the filter bottom section 80 and the portion of gravel thereover divided by its area. The relatively large holes 82 in plate 80 provide an additional advantage in that they materially reduce the head under which the backwash water is required to be supplied to the filter.

Other advantages of the present construction are that the supports for the filter bottom sections are so constructed and arranged as to permit maximum free circulation of water in drain channels 50 and 52 and the beveling of holes 82 reduces the pressure drop through the filter bottoms. The adjustable leg 90 insures full four-point support of plates 81 and compensates for any irregularities in the upper surface of filter floor 34, thereby avoiding excessive mechanical stresses in plate 81.

From the foregoing description, it is apparent that the present invention provides a filter structure capable of achieving the several objectives outlined at the beginning of this present specification. It is of course to be understood that the foregoing description is illustrative only and that numerous modifications can be made in the illustrative structure described without departing from the spirit of the invention as defined in the appended claims.

I claim:

1. A filter bottom unit adapted to form part of a sectional foraminous filter bottom of a sand filter, said unit comprising a perforated plate, a first series of slats secured to one side of said plate at spaced intervals between the perforations of said plate, a second series of slats overlying said first series of slats and secured to said plate, the slats of said second series being angularly arranged with respect to those of said first series and being positioned in registry with the perforations of said plate, three supporting legs of equal height secured to the other side of said plate, and another leg adapted to be fitted to the distance between said plate and a plane support on which said unit rests to ensure uniform support of said unit in said filter.

2. A filter bottom unit adapted to form part of a sectional foraminous filter bottom of a sand filter, said unit comprising a perforated plate, a first series of slats secured in parallel relation to one side of said plate at spaced intervals between the perforations of said plate, a second series of slats overlying said first series of slats and effectively secured to said plate, the slats of said second series being arranged substantially perpendicular to the slats of said first series and being positioned in registry with the perforations of said plate, three supporting legs of equal length secured to the other side of said plate, and a leg of adjustable length secured to said other side of said plate and adapted to be fitted to the distance between said plate and a plane support on which said unit rests to ensure uniform support of said unit in said filter.

3. A filter bottom unit adapted to form part of a sectional foraminous filter bottom of a sand filter, said unit comprising a perforated plate, a first series of slats secured to one side of said plate at spaced intervals between the perforations of said plate, a second series of slats overlying said first series of slats and secured to said plate, the slats of said second series being angularly arranged with repect to those of said first series and being positioned in registry with the perforations of said plate, three supporting legs of equal height secured to the other side of said plate, and another leg adapted to be fitted to the distance between said plate and a plane support on which said unit rests to ensure uniform support of said unit in said filter, the perforations of said plate being beveled at said other side of said plate to reduce frictional resistance to flow through said perforations, said plate, slats and equal legs being formed of asbestos cement.

4. A filter structure comprising a foundation floor, a filter bottom structure composed of a series of units having horizontally arranged perforated plates, the perforated plates of said units being fitted together with their edges in abutting relation to form a substantially continuous filter bottom, a first series of slats secured to the upper sides of said plates at spaced intervals between the perforations of said plates, a second series of slats overlying said first series of slats and secured to said plates, the slats of said second series being angularly arranged with respect to those of said first series and being positioned in registry with the perforations of said plates, each of said units being provided with a plurality of legs by means of which said unit is supported on said floor, said legs resting freely on said floor without being secured thereto.

5. A filter structure comprising a foundation floor, a filter bottom structure composed of a series of units having horizontally arranged perforated plates, the perforated plates of said units being fitted together with their edges in abutting relation to form a substantially continuous filter bottom, a first series of slats secured in parallel relation to the upper sides of said plate at spaced intervals between the perforations of said plates, a second series of slats overlying the slats of said first series and effectively secured to said plates, the slats of said second series being arranged substantially perpendicular to the slats of said first series and being positioned in registry with the perforations of said plates, each of said units having secured thereto a plurality of legs by means of which said unit is supported on said floor, said legs resting freely on said floor without being secured thereto and at least one leg of each of said units being provided with adjusting means accessible from the top of said unit, whereby the effective height of said plate above said floor can be adjusted to insure desired positioning of said plate.

6. A filter structure comprising a foundation floor, a plurality of perforated plates arranged with their edges in freely abutting relation to form a substantially continuous surface, a plurality of legs attached at their upper ends to each of said perforated plates, the bottoms of all said legs freely engaging said foundation floor to hold said perforated plates spaced above said foundation floor whereby said perforated plates can be individually removed from said filter structure without the necessity for disconnecting said legs from said foundation floor.

7. A filter structure comprising a foundation floor, a plurality of perforated plates arranged with their edges in freely abutting relation to form a substantially continuous surface, a plurality of legs attached at their upper ends to each of said perforated plates, the bottoms of all said legs freely engaging said foundation floor to hold said perforated plates spaced above said foundation floor, and an adjustable leg engaging the under surface of each of said perforated plates and freely engaging said foundation floor so that the effective height of each said plate above said floor can be adjusted to insure desired positioning of each said plate whereby said perforated plates can be individually removed from said filter structure without the necessity for disconnecting said legs from said foundation floor.

8. A filter structure comprising a foundation floor, a plurality of perforated plates arranged with their edges in freely abutting relation to form a substantially continuous surface, a plurality of legs attached at their upper ends to each of said perforated plates, the bottoms of all said legs freely engaging said foundation floor to hold said perforated plates spaced above said foundation floor whereby said perforated plates can be individually removed from said filter structure without the necessity for disconnecting said legs from said foundation floor, and a series of baffle strips secured to the upper side of each said plate overlying the perforations of said plate and spaced therefrom.

9. A filter structure comprising a foundation floor, a plurality of perforated plates arranged with their edges in freely abutting relation to form a substantially continuous surface, a plurality of legs attached at their upper ends to each of said perforated plates, the bottoms of all said legs freely engaging said foundation floor to hold said perforated plates spaced above said foundation floor, and an adjustable leg engaging the under surface of each of said perforated plates and freely engaging said foundation floor so that the effective height of each said plate above said floor can be adjusted to insure desired positioning of each said plate whereby said perforated plates can be individually removed from said filter structure without the necessity for disconnecting said legs from said foundation floor, and a series of baffle strips secured to the upper side of each said plate overlying the perforations of said plate and spaced therefrom.

References Cited in the file of this patent
UNITED STATES PATENTS

| | | |
|---|---|---|
| 260,714 | Strunz | July 4, 1882 |
| 519,565 | Bommarius | May 8, 1894 |
| 667,005 | Davis | Jan. 29, 1901 |
| 1,266,132 | Lassen et al. | May 14, 1918 |
| 1,277,832 | Beckley | Sept. 3, 1918 |
| 1,326,385 | Bartlett | Dec. 30, 1919 |
| 1,429,477 | Williamson | Sept. 19, 1922 |
| 1,572,398 | Leopold | Feb. 9, 1926 |
| 1,822,689 | Bressler et al. | Sept. 8, 1931 |
| 473,011 | Moore | Apr. 19, 1892 |
| 2,043,734 | Camp | June 9, 1936 |
| 2,263,964 | Camp | Nov. 25, 1941 |